G. M. FORBESS.
SELF LOADING WAGON.
APPLICATION FILED MAY 28, 1909.
946,028.
Patented Jan. 11, 1910.
2 SHEETS—SHEET 2.
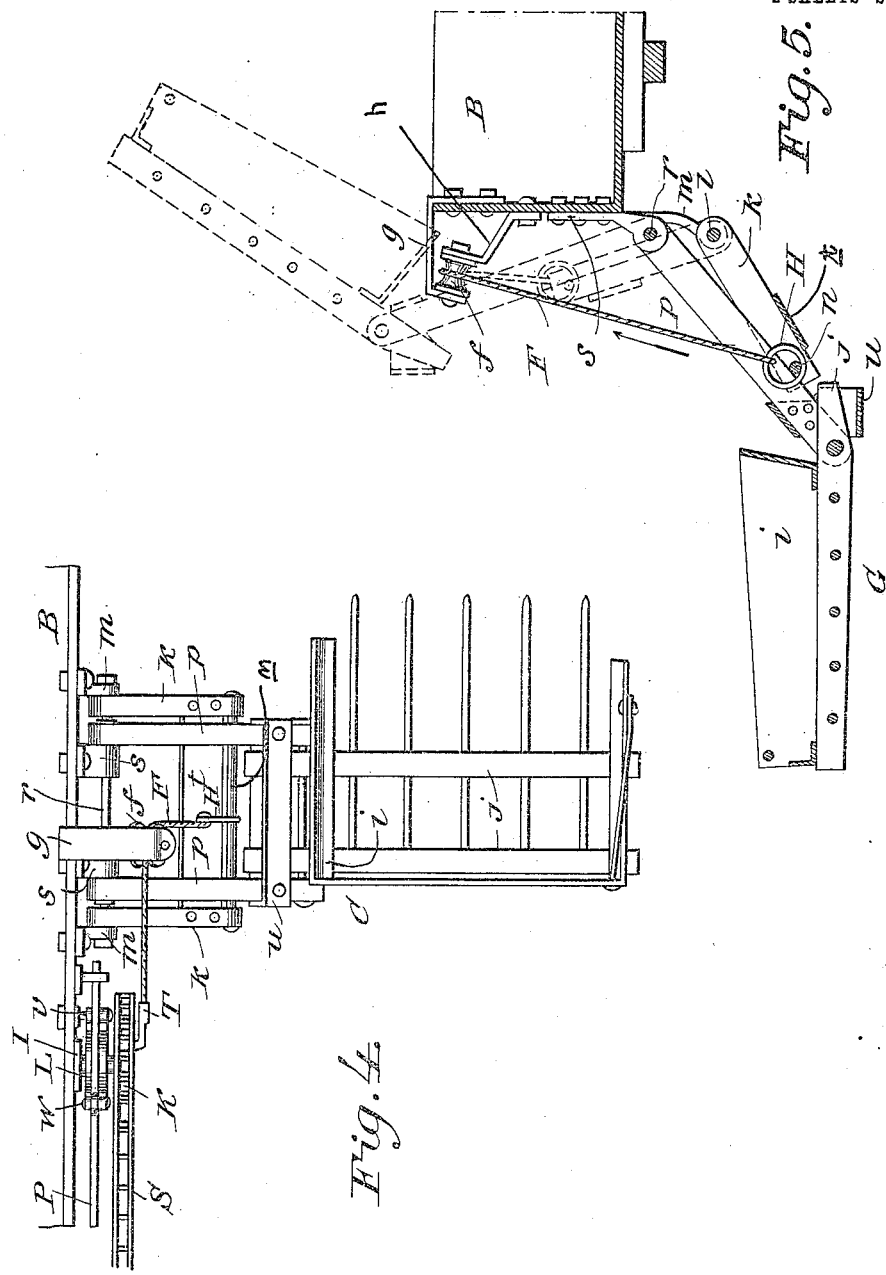
WITNESSES
INVENTOR
G. M. Forbess.
by James Shuly Attorney

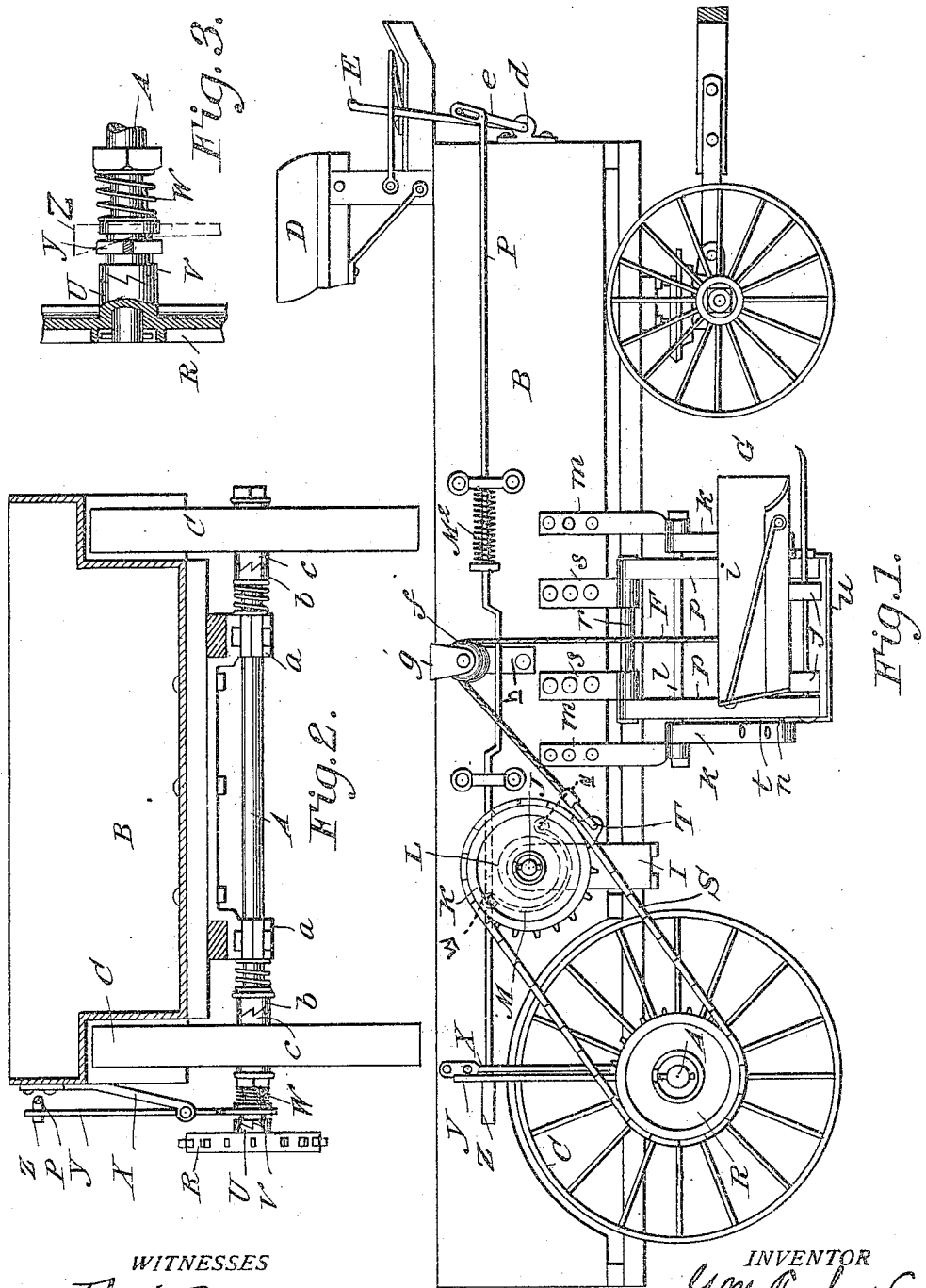

UNITED STATES PATENT OFFICE.

GEORGE M. FORBESS, OF LONGMONT, COLORADO.

SELF-LOADING WAGON.

946,028.  Specification of Letters Patent.  Patented Jan. 11, 1910.

Application filed May 28, 1909. Serial No. 498,898.

*To all whom it may concern:*

Be it known that I, GEORGE M. FORBESS, citizen of the United States, residing at Longmont, in the county of Boulder and State of Colorado, have invented new and useful Improvements in Self-Loading Wagons, of which the following is a specification.

My invention has to do with self-loading wagons; and it contemplates the provision in a wagon, of simple, easily controlled, and efficient means, designed more especially for taking up and depositing shocks of wheat in the wagon when the wheat is to be transferred from shocks to a threshing machine.

With the foregoing in mind, the invention will be fully understood from the following description and claims when the same are read in connection with the drawings, accompanying and forming part of this specification, in which:

Figure 1 is a side elevation showing a wagon equipped with a shock loading mechanism constructed in accordance with my invention. Fig. 2 is a detail transverse section of the same, taken in a plane in front of the rear wheels and looking rearwardly. Fig. 3 is an enlarged fragmentary view of the clutch interposed between the rear axle and the sprocket gear thereon. Fig. 4 is a detail plan view showing the shock receptacle in its lower position. Fig. 5 is a detail view taken at a right angle to Fig. 4 and showing by full lines the shock receptacle in its lower position and by dotted lines said receptacle in its raised position.

Similar letters of reference designate corresponding parts in all of the views of the drawings.

In carrying my invention into effect the wagon may be and preferably is of conventional construction, the rear axle A of the wagon being journaled in bearings $a$ on the body B thereof, and said axle being provided with spring backed clutch members $b$, adapted to coöperate with complementary clutch members $c$ on rear wheels C which latter are loosely mounted on the axle.

At a point within convenient reach of the driver on the seat D, a foot lever E is arranged, the said lever being fixed to a rock shaft $d$ suitably mounted on the body B and having a crank $e$ at its outer end. The body B is also equipped at the same side as the crank $e$ with an inclined sheave $f$, said sheave being mounted between brackets $g$ and $h$, Fig. 5, and being designed to guide the cable F of the shock receptacle which as a whole is lettered G.

By comparison of Figs. 1, 4 and 5 it will be understood that the shock receptacle G is made up of a basket $i$ open at its forward side in order to enable it to readily run under a shock and having inwardly extending arms $j$, bars $k$ pivotally mounted on a longitudinally disposed rod $l$ carried in brackets $m$ and having a cross bar $n$, and bars $p$ pivotally connected to a longitudinally disposed rod $r$ and disposed above the said cross bar $n$, and arranged at opposite sides of and pivotally connected with the arms $j$ of the basket $i$. The brackets $m$ carrying the rod $l$ are fixed to the side of the body B as are also the brackets $s$ in which the rod $r$ is mounted. The bars $k$ are connected at their under sides by a cross bar $t$, and the bars $p$ are equipped adjacent their outer ends with a loop $u$, preferably of metal, which loop is fixed to the bars $p$ and loosely receives the basket arms $j$ after the manner best shown in Fig. 5.

Connection between the cable F and the shock receptacle is preferably effected through the medium of a ring H, loosely mounted on the cross bar $n$, and when the receptacle is in its lower position the parts assume the relative arrangement shown in Fig. 5, the lower wall of the loop $u$ resting under the basket arms $j$, and the basket $i$ occupying a position whereby it is adapted to run under a shock of wheat on the ground. When the cable F is drawn in the direction indicated by arrow in Fig. 5, the shock receptacle or more properly the shock receptacle and elevator is raised to the position shown by dotted lines in Fig. 5, whereupon the shock of wheat will drop from the basket $i$ into the wagon body. It will also be observed that in the latter position of basket $i$, the outer or bottom wall of the loop $u$ will serve to limit the swinging movement of the basket $i$ relative to the bars $p$ and consequently when the combined elevator and receptacle G is lowered, the basket $i$ when it strikes the ground will rest in the position shown in Figs. 1, 4, and 5.

I is a bracket fixed to the side of the body B and arranged in rear of the combined shock receptacle and elevator G. J is a shaft journaled in said bracket and carrying a sprocket gear K and a brake disk L.

M is a brake band, preferably of resilient metal, connected at one end with body B as indicated by *v* in Figs. 1 and 4, and P is a rod connected to the crank *e* and also to the free end *w* of the brake band M. Thus it will be manifest that when the foot lever E is pressed forward, the brake band M will be applied to the disk L and put under tension; also, that when the foot lever E is relieved of pressure the spring $M^2$ will tend in resuming its normal state to pull the rod P and the foot lever E rearwardly.

One end of the rear axle A is extended considerably beyond the adjacent wheel C and on said extended end of the axle is loosely mounted a sprocket gear R connected by a sprocket belt S with the sprocket gear K. The sprocket belt S is connected at T with the cable F, and from this it follows that when the sprocket gear R is fixed to the axle A while the wagon is moving forwardly, the combined shock receptacle and elevator G will be raised to the position shown by dotted lines in Fig. 5 in the manner and for the purpose before described and will then move back to the position on the ground. It will also be understood that during the completion of the downward movement of the receptacle and elevator G, the band M acting against the disk L, fixed with respect to sprocket gear K will tend to brake or retard the downward movement of said device G and in that way avoid injury thereto.

On its inner side the sprocket gear R is provided with a clutch member U, and splined or feathered on the extended portion of the axle A is a complementary clutch member V, backed by a spring W and having a circumferential groove. A bracket X is fixed to the side of the body B and reaches to a point at the outer side of the adjacent wheel C, and fulcrumed at an intermediate point of its length on the said bracket X is a transversely rocking lever Y the lower end of which terminates in a fork disposed in the circumferential groove of the clutch member V. The upper arm of the lever Y is arranged at the outer side of a wedge shaped terminal Z on the rear end of the suitably guided rod P. When the foot lever E is relieved of pressure as before described and the rod P is drawn rearwardly, the wedge shaped terminal Z on said rod will of course be moved rearwardly, whereupon the spring W will press the clutch member V into engagement with the clutch member U, and by so doing will rock the upper arm of lever Y inwardly. This will bring about the movement of the sprocket belt S and the attendant raising of the combined shock receptacle and elevator G. Then when the foot lever E is pressed forwardly, the wedge shaped terminal Z will move forwardly and by acting against the upper arm of lever Y will disengage the clutch member V from the clutch member U, whereupon the device G will gravitate to its lower position, its downward progress being retarded as before described by the brake band M coöperating with the disk L.

Incidental to the up and down movements of the combined receptacle and elevator G, the connection T passes from the position shown in Fig. 1, downwardly and around sprocket gear R and upwardly and around sprocket gear K, in the order named, and back to its initial position; and from this it follows that after an operation of the combined receptacle and elevator G it is not necessary to press the lever E forwardly and separate the clutch member V from clutch member U until the device G is back on the ground. It is preferable, however, to press the lever E forwardly and separate the clutch member V from the clutch member U when the device G is on its downward movement and near the ground, this latter to enable the band M to coöperate with the disk L for the purpose before described. It also follows that when the lever E is pressed forwardly as stated, the brake band M will coöperate with the disk L to stop the belt S in the position shown in Fig. 2.

While, as before stated, the wagon is preferably of conventional construction, it will be noted that the wheels C are in under the box B, this being advantageous since it enables the sprocket gears R and K to lie in a plane close to that of the adjacent side of the body B and also enables the cable F to pass straight back from the sheave *f*.

The construction herein illustrated and described constitutes the best practical embodiment of my invention that I have as yet devised, but it is obvious that in the future practice of the invention such changes or modifications may be made as do not involve departure from the scope of my invention as defined in the claims appended.

Having described my invention, what I claim and desire to secure by Letters-Patent, is:

1. The combination of a wheeled vehicle having a body, a combined receptacle and elevator comprising a basket, inwardly extending arms on the basket, bars pivotally connected with the body and the basket, a loop fixed to said bars and having a portion disposed under the basket arms, a connection intermediate a wheel of the vehicle and the bars of the combined receptacle and elevator, adapted to raise the latter and also adapted to be interrupted, and manually controlled means for interrupting said connection.

2. The combination of a wheeled vehicle having a body, a combined receptacle and elevator pivotally connected with and adapted to extend laterally outward from the body, a lever mounted on the body, a sprocket gear, a connection intermediate one of the vehicle wheels and said sprocket gear and comprising a disconnecting device, means connected with the lever and said disconnecting device for operating the latter, a second sprocket gear carried by the body, a sprocket belt mounted on the sprocket gears, a sheave mounted on the body, and a cable passed over said sheave and connecting the combined receptacle and elevator and the sprocket belt.

3. The combination of a wheeled vehicle having a body, a combined receptacle and elevator pivotally connected with and adapted to extend laterally outward from the body, a lever mounted on the body, a sprocket gear, a connection intermediate one of the vehicle wheels and said sprocket gear and comprising a disconnecting device, means connected with the lever and said disconnecting device for operating the latter, a second sprocket gear carried by the body, a disk fixed with respect to said gear, a brake band adapted to coöperate with said disk and connected at one end with said body and at its opposite end with said means, a sprocket belt connecting the sprocket gears, a sheave carried by the body, and a cable passed over said sheave and connecting the combined receptacle and elevator and the sprocket belt.

4. The combination of a wheeled vehicle having a body, a combined receptacle and elevator pivotally connected with and adapted to extend laterally outward from the body, a lever mounted on the front portion of the body, a sprocket gear loosely mounted on an axle of the vehicle outside the adjacent wheel thereof and having a clutch member, a complementary, spring-backed clutch member adapted to turn with said wheel and axle and slide on the latter, a lever connected and movable with said clutch member, a second sprocket gear carried by the body, a disk fixed with respect to said gear, a brake band adapted to coöperate with said disk and connected at one end with the body, a rod connected with the first named lever and the brake band and provided with means for moving the lever complementary to the clutch member and thereby disengaging said clutch member from that on the sprocket gear, a sprocket belt connecting the gears, a sheave on the body, and a cable passed over said sheave and connecting the combined receptacle and elevator and the sprocket belt.

In testimony whereof I have hereunto set my hand in presence of two subscribing witnesses.

GEORGE M. FORBESS.

Witnesses:
W. C. COULEHAN,
AMOS A. MAHAN.